US008260256B2

(12) United States Patent
Mumick

(10) Patent No.: US 8,260,256 B2
(45) Date of Patent: Sep. 4, 2012

(54) BILLING OFF-NET USERS FOR TELECOM SERVICES

(75) Inventor: Inderpal Singh Mumick, Berkeley Heights, NJ (US)

(73) Assignee: Kirusa Inc., New Providence, NJ (US)

( * ) Notice: Subject to any disclaimer, the term of this patent is extended or adjusted under 35 U.S.C. 154(b) by 715 days.

(21) Appl. No.: 12/008,321

(22) Filed: Jan. 9, 2008

(65) Prior Publication Data
US 2009/0176478 A1 Jul. 9, 2009

(51) Int. Cl.
H04M 11/00 (2006.01)
H04M 1/725 (2006.01)
H04M 11/10 (2006.01)
H04M 15/00 (2006.01)

(52) U.S. Cl. ............... 455/406; 455/466; 455/412.1; 455/412.2; 455/413; 379/114.16; 379/114.2

(58) Field of Classification Search .......... 455/406, 455/466, 412.1, 412.2, 413; 379/114.16, 379/114.2
See application file for complete search history.

(56) References Cited

U.S. PATENT DOCUMENTS

| 5,864,606 | A | 1/1999 | Hanson et al. |
| 6,188,752 | B1 * | 2/2001 | Lesley ............... 379/114.16 |
| 6,813,489 | B1 | 11/2004 | Wu et al. |
| 7,043,228 | B2 | 5/2006 | Uppal et al. |
| 7,092,696 | B1 * | 8/2006 | Hosain et al. ............ 455/405 |
| 2002/0183040 | A1 * | 12/2002 | Lundstrom et al. ......... 455/406 |
| 2003/0114140 | A1 * | 6/2003 | Iivonen et al. ............ 455/406 |
| 2005/0136955 | A1 * | 6/2005 | Mumick et al. ............ 455/466 |
| 2005/0215231 | A1 * | 9/2005 | Bauchot et al. ............ 455/405 |
| 2006/0041505 | A1 * | 2/2006 | Enyart ..................... 705/40 |
| 2006/0149644 | A1 | 7/2006 | Sulmar et al. |

FOREIGN PATENT DOCUMENTS
EP 1777972 A1 * 4/2007
* cited by examiner

Primary Examiner — Ariel Balaoing
(74) Attorney, Agent, or Firm — Ash Tankha; Lipton, Weinberger & Husick

(57) ABSTRACT

Disclosed herein is a method of billing a user for Voice short messaging services. A user subscribing to a first network may send a first Voice short messaging service (Voice SMS) message to a recipient user subscribing to a second network. The recipient user may reply to or forward the first Voice SMS message. The Voice SMS message reply may be routed to an intelligent network element of the first network. The intelligent network element prompts the recipient for a payment for delivering the Voice SMS message reply to the sender. The off-net recipient user may make the payment through a premium chargeable SMS message. A confirmation of this payment is communicated to the intelligent network element by the second network.

16 Claims, 2 Drawing Sheets

BILLING OFF-NET USERS FOR TELECOM SERVICES

BACKGROUND

This invention in general relates to telecommunication services and implementations, and specifically relates to a method and system for billing an off-net user for use of telecom services provided by telecom carriers. Exemplary telecom services comprise the activity of replying to and forwarding a Voice short messaging service (Voice SMS) message received by an off-net user.

Consider a first user subscribing to a first network that provides Voice short messaging services (Voice SMS). The first user may send a Voice SMS message to a second user subscribing to a second network using the number of the second user's device. A Voice SMS server of the first network in communication with a short messaging service center (SMSC) of the first network notifies the second user of the Voice SMS message with a number or a link that the second user can use to retrieve the Voice SMS message. A reply or forward from the second user is a desirable feature for an effective communication between the users. When the second user opts to reply to or forward the Voice SMS message, the reply or forward Voice SMS message is routed through the Voice SMS server of the first network. In such a case, the SMSC of the first network sends the message, but the first network may not be able to bill the second user for the reply message. The Voice SMS server of the first network is not able to bill the second user since the second user subscribes to a different network. Thus, there is a need for effectively charging the second user to pay for the reply feature, and distributing this payment to the network operators involved.

SUMMARY OF THE INVENTION

Disclosed herein is a method of billing a user for replying to and forwarding a Voice short messaging service (Voice SMS) message. A sender subscribing to a first network, hereafter referred to as an on-net user, may send a first Voice SMS message to a recipient user subscribing to a second network, hereafter referred to as an off-net user. The recipient user is an off-net user with respect to the first network as the recipient user is not subscribing to the first network. The off-net user may reply to the first Voice SMS message by a second Voice SMS message. The second Voice SMS message, i.e. the Voice SMS message reply is routed to an intelligent network element of the first network. The intelligent network element prompts the recipient for a payment for delivering the Voice SMS message reply to the sender. The intelligent network element prompts the off-net user by sending a text SMS message prompt to the off-net user, asking the off-net user to pay a stated fee for replying to or forwarding the Voice SMS message. If the off-net user sends a reply SMS message to the text SMS message prompt, the off-net user is charged a stated fee by the second network for sending the SMS message. Such an SMS message sent by the off-net user in reply to the text SMS message prompt is usually a premium SMS as it incurs a charge higher than a normal SMS sent by the off-net user.

The operator of the second network collects revenue for the premium SMS from the off-net user, but then shares a part of the revenue with the operator of the first network. The premium SMS sent by the off-net user is received by the intelligent network element on the first network, confirming that the off-net user has paid. The intelligent network element then authorizes the sending of the reply to the on-net user. In case the off-net user confirms payment for forwarding the first Voice SMS message, the intelligent network element also authorizes the forwarding of the message. The entire interaction by the intelligent network element may occur while the off-net user is connected on the call with the Voice SMS server, or within a certain period of time after the off-net user has disconnected, or at any time after the off-net user has disconnected.

A Voice SMS platform of the first network transfers Voice SMS messages between the sender and the recipient. By way of example, the Voice SMS platform may be a multimodal platform that supports multimodal SMS applications, which is disclosed and claimed in patent application Ser. No. 11/019,754, now U.S. Pat. No. 7,184,786, titled "Techniques for combining voice with wireless text short message services", which is referenced herein in its entirety. U.S. Pat. No. 7,184,786 discloses a mechanism for combining voice, or other modalities, with standard SMS text messages. The mechanism allows users to send and receive voice messages associated with text SMS messages. According to U.S. Pat. No. 7,184,786, a user of standard SMS text service is provided with a link within each message that allows adding or retrieval of a voice message associated with an SMS text message. The Voice SMS platform may be associated with a media platform that is used for recording or playing back voice recordings, recognition of voice commands, and rendering of text into speech. A short message service center (SMSC) in communication with the Voice SMS platform provides a standard mechanism for transmitting SMS text messages and is also used to transmit or to insert the link into the text messages that allow connection to the Voice SMS platform. The media platform may be used to retrieve and play the Voice SMS message to the recipient user.

The system and method disclosed herein can be implemented using standard wireless telephone devices capable of sending and receiving SMS messages and can be extended to other device types, and network technologies. Further, the disclosure herein is not limited to wireless phones but will also work with wired line phones with SMS capabilities, and with wired line phones without SMS capability, and services over such wired line devices. Preferably user input and/or output devices are capable of playing and recording speech and capable of entering and displaying text information.

BRIEF DESCRIPTION OF THE DRAWINGS

The foregoing summary, as well as the following detailed description of the embodiments, is better understood when read in conjunction with the appended drawings. For the purpose of illustrating the invention, exemplary constructions of the invention are shown in the drawings. However, the invention is not limited to the specific methods and instrumentalities disclosed herein.

DETAILED DESCRIPTION OF THE INVENTION

Definitions

Figure 1:
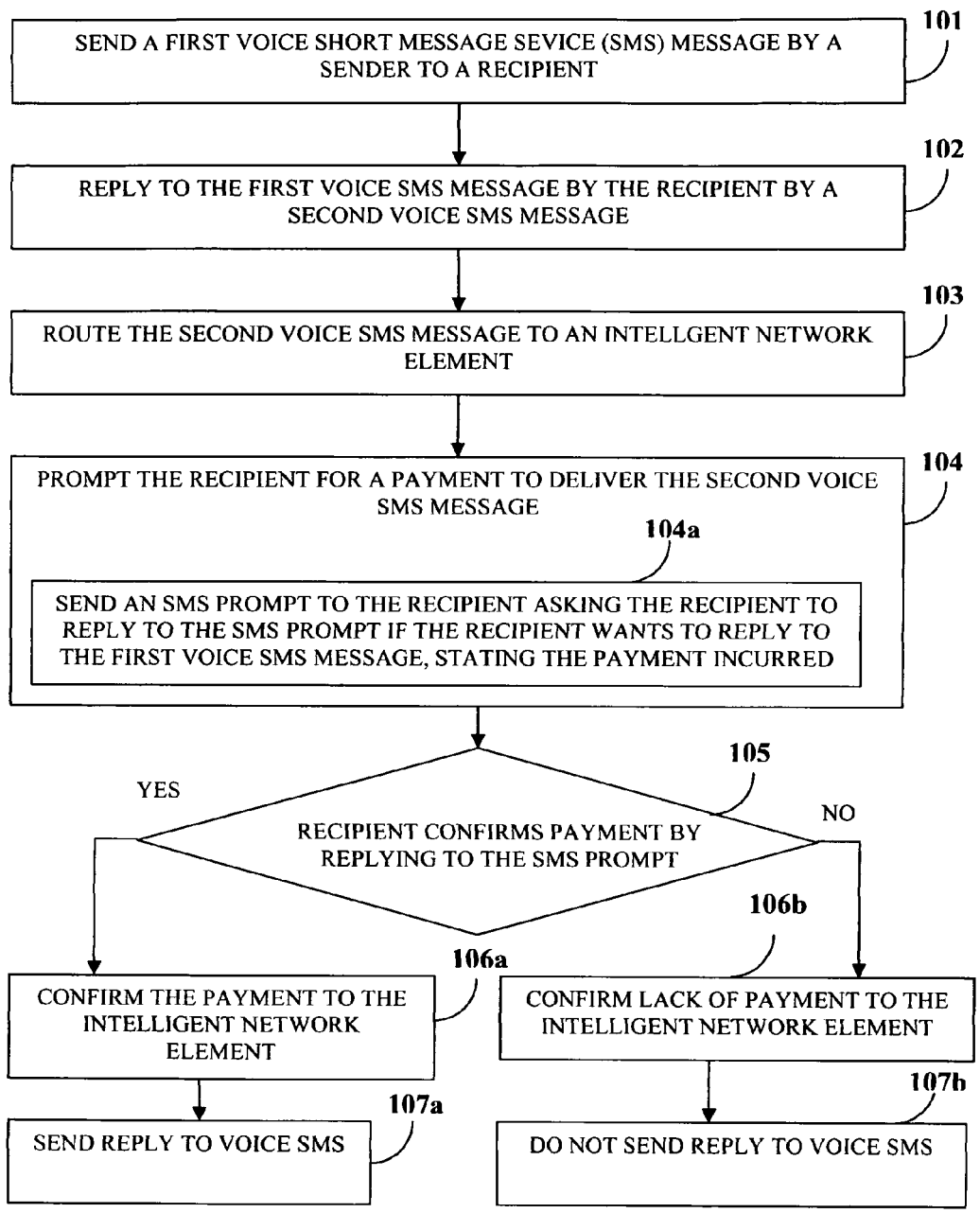
FIG. 1 illustrates a method of billing an off-net user for Voice short messaging services.

On-net user: An on-net user 203 is a user subscribing to the first network 201 that is associated with a Voice short messaging service (Voice SMS) platform 206.

Off-net user: An off-net user 205 is a user subscribing to the second network 202. The user 205 is off-net with respect to the first network 201 as the user 205 is not subscribing to the first network 201.

Voice SMS platform: Voice SMS platform 206 allows users to send and receive Voice SMS messages. The Voice SMS platform provides mechanism to send and receive Voice SMS messages. The Voice SMS platform 206 is associated with the first network 201. Reference is made to the patent application Ser. No. 11/019,754, now U.S. Pat. No. 7,184,786, titled "Techniques for combining voice with wireless text short message services". U.S. Pat. No. 7,184,786 discloses a method of combining speech with text messaging services, to create multimodal SMS services.

Sender: A sender creates a Voice SMS message using the Voice SMS platform 206 and provides the intended recipient device address.

Recipient: A recipient is a user retrieving the Voice SMS message of the sender from the Voice SMS platform 206.

FIG. 1 illustrates a method of billing for Voice short messaging services. A Voice SMS platform 206 allows users to send and receive Voice SMS messages within a network and across networks.

An on-net user 203 subscribing to a first network 201 may send a first Voice SMS message 101 to a recipient user 205 subscribing to a second network 202. The recipient user 205 is an off-net user with respect to the first network 201 as the recipient user is not subscribing to the first network 201. The off-net user 205 may reply to the first Voice SMS message by a second Voice SMS message 102. The second Voice SMS message or SMS message reply is routed 103 to an intelligent network element (IN) 211 of the first network 201. The intelligent network element 211 prompts 104 the off-net user 205 for a payment for delivering the Voice SMS message reply to the sender, i.e. the on-net user 203. In one embodiment, the off-net user 205 may be prompted for the payment through a text SMS message prompt. The text SMS message prompt sent 104*a* may query whether the off-net user wishes to reply to the first voice SMS message, stating the payment to be incurred to send the reply. The off-net user 205 makes the payment through a premium chargeable SMS message. The off-net user 205 may confirm payment by replying to a number specified in the text SMS message prompt or by replying 105 to the text SMS message prompt with a premium chargeable SMS message. A confirmation of the payment 106*a* may be communicated to the intelligent network element 211 by the second network 202. In an embodiment, the premium chargeable SMS message may be routed to the intelligent network element 211, thereby confirming payment 106*a* for delivering 107*a* the Voice SMS reply.

In case the off-net user does not reply to the text SMS message prompt, a lack of payment is communicated 106*b* to the intelligent network element 211. The reply Voice SMS message is not delivered 107*b* to the on-net user due to the lack of payment.

Prior to delivering the Voice SMS message to the off-net user 205, the on-net user may first record the voice message at the Voice SMS platform 206. A short message service center (SMSC) of the first network 201 then sends a text notification message to the off-net user 205 including a link or number that allows the off-net user 205 to get connected to the Voice SMS platform 206 and retrieve the voice message. After listening to the voice message, the off-net user 205 may wish to reply to the first Voice SMS message with a second Voice SMS message. The off-net user 205 indicates a reply option, for example by pressing a specified key on the user's device, and establishes a reply session with the Voice SMS platform 206 of the first network 201. The off-net user 205 is prompted by the Voice SMS platform 206 to record a reply message. The recorded reply message, i.e. the second SMS message gets stored at the Voice SMS platform 206. The second Voice SMS message is then routed to an intelligent network element 211 of the first network 201. The intelligent network element 211 or the Voice SMS platform 206 prompts the off-net user 205 for a payment to deliver the second Voice SMS message to the on-net user 203. The off-net user 205 may make the payment by sending a premium chargeable SMS message to a predetermined number. The second Voice SMS message is delivered to the on-net user 203 by the Voice SMS platform 206 after confirmation of the payment is received by the intelligent network element 211. A record of the payment is created at the intelligent network element 211 and stored in a payment record maintained by the intelligent network element 211. In an embodiment of the invention, record of the payment is created at the Voice SMS platform 206 and stored in a payment record maintained by the Voice SMS platform 206.

In an embodiment, an optional intermediary SMS gateway 210 is used between the first network 201 and the second network 202. The SMS gateway 210 is a third party service that offers the ability to charge subscribers of the second network 202 using premium SMS messages. Thus, in cases where the first network 201 may not directly have premium SMS interconnectivity to the second network 202, the SMS gateway 210 may be used to interconnect the first network 201 and the second network 202. The second network 202 may indicate the confirmation of the payment to the SMS gateway 210, and the SMS gateway 210 in turn confirms the payment to the intelligent network element 211 of the first network 201.

The payment amount may be distributed between the operators of the first and second networks 201 and 202, and the operator of the intermediary SMS gateway 210. The network operator of the second network 202 may debit the payment amount from the off-net user's account. A pre-specified percentage of the debited amount is paid to the gateway operator, and the network operator of the first network 201 as premium SMS charges.

For example, consider an on-net user Alice, subscribing to network N, sending a Voice SMS message to an off-net user Bob subscribing to network M. Alice is charged by the Voice SMS platform 206 of network N for delivering the Voice SMS message to Bob. The charge for the delivery may be determined in accordance with a preset pricing model established by the network N. After listening to Alice's Voice SMS message, Bob may reply by pressing a specific button on the keypad of the mobile device. Bob records a reply voice message that is stored at the Voice SMS platform 206. The reply message is then routed to the intelligent network element of the network N. The intelligent network element determines a charge or amount for delivering the reply voice message to Alice in accordance with the preset pricing model. The intelligent network element prompts Bob through a text SMS message for the payment. Bob may make the payment by sending a premium chargeable SMS message to a predetermined number or a number specified in the text SMS message prompt, or by simply replying to the text SMS message prompt.

In another embodiment, the step of prompting the off-net user 205 for the payment to deliver the Voice SMS message reply may precede the step of the off-net user 205 recording the reply voice message. When the off-net user 205 confirms or makes the payment for delivering the reply Voice SMS message, the off-net user 205 may be prompted to record the voice message. The Voice SMS platform 206 may decide to obtain confirmation of the payment before recording the message for several reasons. For example, the resources required to record the message may be conserved if the off-net user 205 is not willing to make a payment.

In one embodiment, the off-net user 205 may be able to initiate a new Voice SMS message to an on-net user 203. The off-net user 205 is given a number that the off-net user 205 may dial to get connected to the Voice SMS platform 206 and record a new message and a destination number for the on-net user 203. The intelligent network element 211 then prompts the off-net user 205 for payment, in the same manner as the off-net user 205 is prompted for sending a reply to a message initiated by the on-net user 203.

In one embodiment, the on-net user 203 may confirm that the on-net user 203 will pay for a reply to be received by the off-net user 205. In such a case, a payment is charged to the on-net user 203 when the off-net user 205 sends the reply message, and the reply is free of charge for the off-net user 205. The on-net user 203 may confirm the payment in advance. The intelligent network element 211 may record the payment against the device addresses of the on-net user 203 and the off-net user 205. The off-net user 205 may reply to the on-net user's SMS message by recording a reply voice message. As described above, the reply message is routed to the intelligent network element 211. The intelligent network element 211 may look up the device addresses of both the on-net 203 and off-net users 205 in the payment record and determine that a prior payment has already been confirmed by the on-net user 203. In this case, the payment amount is debited from the on-net user's account by the operator of the first network 201. The on-net user 203 may confirm prior payment for reply to a particular Voice SMS message or for a particular recipient device address. In another embodiment, the on-net user 203 may confirm payments for all Voice SMS message replies in advance.

In another embodiment, the off-net user 205 after receiving the Voice SMS message by an on-net user 203 may wish to forward the message. The off-net user 205 may forward the message by pressing a specific key or through other user interfaces on the user's device. The off-net user 205 may be subsequently prompted by the Voice SMS platform 206 to enter the destination device address or addresses. The off-net user 205 is again prompted by the intelligent network element 211 for a payment for forwarding the Voice SMS message to recipient device addresses. The off-net user 205 may make the payment by sending a premium chargeable SMS message to a predetermined number. Once a confirmation of the payment is received by the intelligent network element 211, the Voice SMS message is forwarded to destination device addresses. In accordance with this embodiment, the off-net user 205 may forward the Voice SMS message to a group of users. The off-net user 205 may be charged a higher amount for forwarding to a group of users than the payment amount for forwarding to a single user.

In another embodiment, different tariffs may be applied to the reply service for the off-net user 205 for different types of Voice SMS messages. Also, depending on the types of Voice SMS messages, different proportions of the payment may be distributed among the networks and/or network elements involved in delivering the reply message to the on-net user 203. Different tariffs may be applied by providing different numbers in the SMS message prompts sent to the off-net user 205 for confirming the payments. The off-net user 205 sends the premium chargeable SMS message to the number specified in the prompt message thereby being charged the tariff as applicable to the number specified. For example, an SMS message prompt sent to the off-net user 205 to confirm payment for a reply to a Voice SMS message sent by the on-net user 203 to the off-net user 205 may specify the reply number for the SMS message as 5555. The off-net user 205 may then send a premium chargeable SMS to 5555. A premium SMS to 5555 may cause the mobile operator of the off-net user 205 to debit, for example 10 cents from the off-net user's account, wherein the mobile operator of the second network 202 pays 7 cents to the gateway operator, and the gateway operator pays 5 cents to the mobile operator of the on-net user 203. In another example, a television show may allow an off-net user 205 to participate in the show by replying to a Voice SMS message. The off-net user 205 is charged a higher payment for sending a reply to the television show via a Voice SMS message. In such a case, the number specified in the prompt SMS message used to confirm payments may be different, for example 6666. A premium chargeable SMS to 6666 may cause the mobile operator of the off-net user 205 to debit 15 cents from the off-net user's account. The mobile operator may pay 10 cents to the gateway operator and the gateway operator may pay 7 cents to the mobile operator that sent the message on behalf of the television show.

Figure 2:
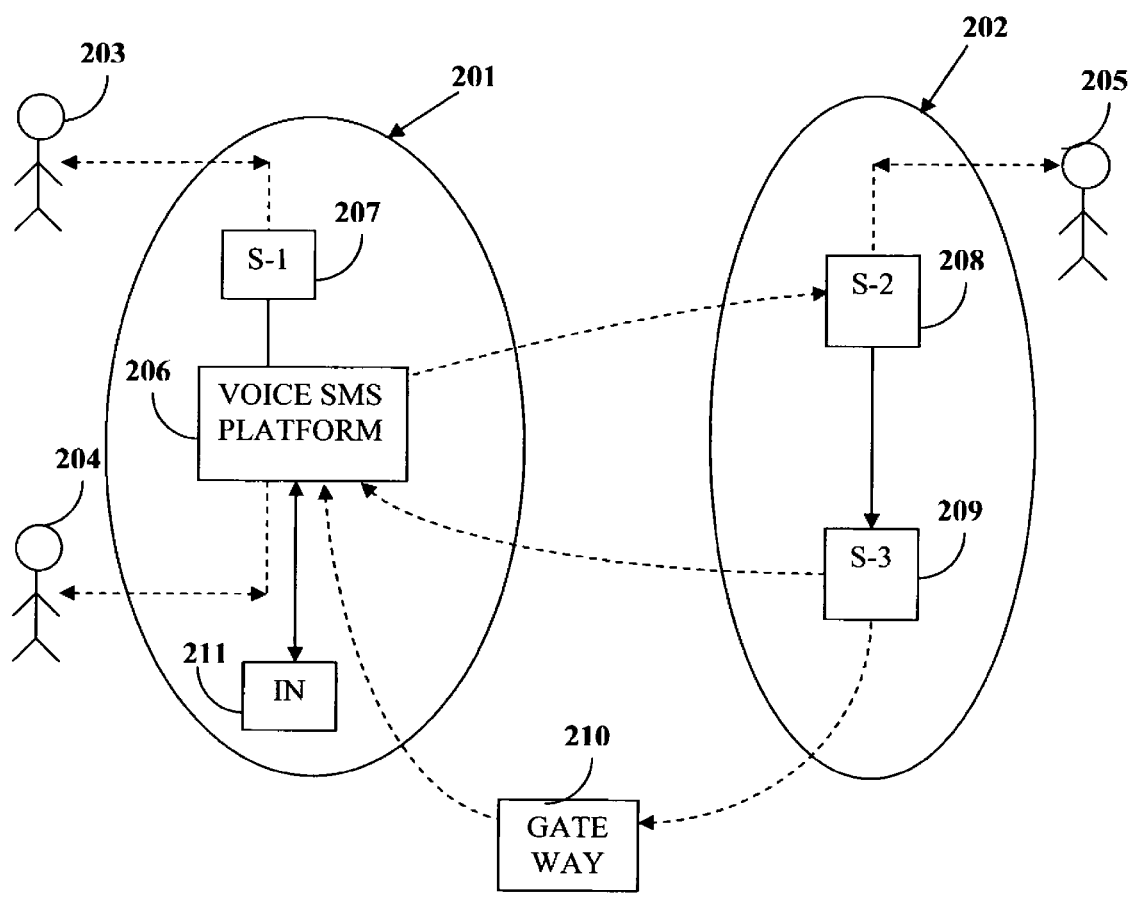
FIG. 2 illustrates a system for billing an off-net user for Voice short messaging services.

FIG. 2 illustrates a system for billing off-net users for Voice short messaging services. A short message service center (SMSC) in communication with the Voice SMS platform 206 provides a standard mechanism for transmitting SMS text messages and is also used to transmit or to insert the link into the text messages that allow connection to the Voice SMS platform 206. The Voice SMS platform 206 may be used to retrieve and play the Voice SMS message to the recipient user.

On-net users 203 and 204 subscribe to the first network 201. The on-net user 203 may send a Voice SMS message to a user 205 who is serviced by a second network 202. The user 205 is an off-net user, i.e. a user not subscribing to the first network 201. Switches S-1 207 and S-2 208 of the first and second networks 201 and 202 respectively use the recipient device address and connect to the off-net user 205. A notification message of the Voice SMS message is sent to the off-net user 205 by the SMSC of the first network 201 using the connection through switches S-1 207 and S-2 208. The off-net user 205 can use the link associated with the text notification message to connect to the Voice SMS platform 206 and/or retrieve the Voice SMS message. Switch S-3 209 of the second network 202 is able to determine that the link refers to the Voice SMS platform 206. Switch S-3 209 may then route and connect the off-net user 205 to the Voice SMS platform 206. The off-net user 205 listens to the Voice SMS message rendered by the Voice SMS platform 206.

The off-net user 205 may reply to this voice message by indicating a reply through the press of a specific key or a sequence of keys on the keypad of the user's device. The off-net user 205 is prompted to record the reply Voice SMS message by the Voice SMS platform 206. Switch S-3 may not be able to determine a charge for the reply. Hence, the reply Voice SMS message is routed to the intelligent network element (IN) 211. The intelligent network element 211 determines a charge or amount for the reply service and prompts the off-net user 205 for a payment by sending an SMS message prompt to the off-net user 205. The off-net user 205 may make the payment by sending a premium chargeable message to the number specified in the SMS message prompt. A confirmation of the payment for the reply service is communicated to the intelligent network element 211 and the Voice SMS platform 206 by the SMS gateway 210. The intelligent network element 211 or the Voice SMS platform 206, after receiving the confirmation, delivers the reply Voice SMS message of the off-net user 205 to the on-net user 203.

In an embodiment, either of the switches S-2 208 and S-3 209 in the network 202 may be configured to route the reply call to the Voice SMS platform 206. The number provided in the SMS message prompt for accessing the Voice SMS platform 206 may be a premium number. The off-net user 205 pays a premium charge for dialing in on the premium number. The extra payment is received by the network 201 through premium charges on the voice call used to do a reply, without using a premium chargeable SMS message for the reply service.

It will be readily apparent to those skilled in the art that the various methods and algorithms described herein may be implemented in a computer readable medium, e.g., appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A "processor" means any one or more microprocessors, Central Processing Unit (CPU) devices, computing devices, microcontrollers, digital signal processors, or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product, comprising computer executable instructions embodied in a computer-readable medium, comprises computer parsable codes for the implementation of the processes of various embodiments.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel® processors, AMD® processors, UltraSPARC® processors, etc. that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

I claim:

1. A method of billing for voice short messaging services, comprising the steps of:
    sending a first voice short messaging service message by a sender subscribing to a first network to a recipient subscribing to a second network;
    replying to said first voice short messaging service message by said recipient using a second voice short messaging service message;
    routing said second voice short messaging service message to an intelligent network element of the first network;
    looking up device addresses of said sender and said recipient in a payment record stored on the intelligent network element by the intelligent network element to determine whether a prior payment for delivering the second voice short messaging service message has been confirmed by said sender;
    prompting the recipient for a payment by said intelligent network element for delivering the second voice short messaging service message to said sender, if said prior payment for said delivery of the second voice short messaging service message is not confirmed by said sender;
    making said payment for the second voice short messaging service by said recipient through one of a premium chargeable short messaging service message and a premium chargeable reply voice call, if said prior payment for said delivery of the second voice short messaging service message is not confirmed by said sender;
    collecting said payment by one of an operator of said first network and an operator of said second network and sharing a part of said payment with the other of said operator of the first network and the operator of the second network; and
    confirming said collected payment to the intelligent network element.

2. The method of claim 1, wherein the recipient is prompted for the payment through a short messaging service message prompt.

3. The method of claim 2, wherein the recipient sends the premium chargeable short messaging service message to a number specified in said short messaging service message prompt, wherein a different tariff is applied for said delivery of the second voice short messaging service message to said sender by specifying a different number in said short messaging service message prompt to which the recipient sends the premium chargeable short messaging service message.

4. The method of claim 1, wherein the second voice short messaging service message is delivered to the sender after receiving said confirmation of the payment from the second network.

5. The method of claim 1, wherein the recipient replies to the first voice short messaging service message by recording the second voice short messaging service message on a voice short messaging service platform in the first network.

6. The method of claim 5, wherein the second voice short messaging service message of the recipient is recorded by said voice short messaging service platform after receiving confirmation of the payment from the second network.

7. The method of claim 1, wherein the sender confirms said prior payment that is chargeable to the sender for the second voice short messaging service message reply.

8. The method of claim 1, further comprises the step of billing the recipient for forwarding the first voice short messaging service message to one of a single user and a group of users.

9. A method of billing for voice short messaging services, comprising the steps of:
   sending a voice mail message by a sender subscribing to a first network to a recipient subscribing to a second network;
   replying to said voice mail message by said recipient using a voice short messaging service message;
   routing said voice short messaging service message to an intelligent network element of the first network;
   looking up device addresses of said sender and said recipient in a payment record stored on the intelligent network element by the intelligent network element to determine whether a prior payment for delivering the second voice short messaging service message has been confirmed by said sender;
   prompting the recipient for a payment by said intelligent network element for delivering the voice short messaging service message to said sender, if said prior payment for said delivery of the second voice short messaging service message is not confirmed by said sender;
   making said payment for the second voice short messaging service by said recipient through one of a premium chargeable short messaging service message and a premium chargeable reply voice call, if said prior payment for said delivery of the second voice short messaging service message is not confirmed by said sender; and
   confirming said payment to the intelligent network element.

10. The method of claim 9, wherein the recipient makes the payment through one of a premium chargeable short messaging service message and a premium chargeable reply voice call.

11. A system for billing voice short messaging services comprising:
   a first network comprising a voice short messaging service platform;
   a second network;
   said voice short messaging service platform for transferring voice short messaging service messages between a sender subscribing to said first network and a recipient subscribing to said second network; and
   an intelligent network element of the first network for looking up device addresses of said sender and said recipient in a payment record stored on said intelligent network element to determine whether a prior payment for delivering a voice short messaging service message reply of the recipient to said sender has been confirmed by said sender;
   said intelligent network element prompting said recipient for a payment for the activity of delivering said voice short messaging service message reply of the recipient to said sender, if said prior payment for said delivery of the second voice short messaging service message is not confirmed by said sender, wherein the recipient makes the payment through one of a premium chargeable short messaging service message and a premium chargeable reply voice call; and
   said intelligent network element delivering said voice short messaging service message to said recipient after confirmation of reception of said payment, and wherein said payment is distributed among operators of said first network and said second networks.

12. The system of claim 11, wherein the recipient is prompted through a short messaging service message prompt for the payment.

13. The system of claim 11, wherein the recipient sends the premium chargeable short messaging service message to a number specified in said short messaging service message prompt.

14. The system of claim 11, wherein one of said intelligent network element and the voice short messaging service platform records the details of the payment.

15. A computer program product comprising a non-transitory computer-readable storage medium having computer readable program codes embodied thereon, said computer-readable program codes comprising:
   a first computer readable program code for sending a first voice short messaging service message by a sender subscribing to a first network to a recipient subscribing to a second network;
   a second computer readable program code for routing said second voice short messaging service message to an intelligent network element of the first network;
   a third computer readable program code for looking up device addresses of said sender and said recipient in a payment record stored on the intelligent network element by said intelligent network element to determine whether a prior payment for delivering the second voice short messaging service message has been confirmed by said sender;
   a fourth computer readable program code for prompting the recipient for a payment by said intelligent network element for delivering the second voice short messaging service message to said sender, if said prior payment for said delivery of the second voice short messaging service message is not confirmed by said sender;
   a fifth computer readable program code for making said payment for the second voice short messaging service by recipient through one of a premium chargeable short messaging service message and a premium chargeable reply voice call, if said prior payment for said delivery of the second voice short messaging service message is not confirmed by said sender, and wherein said payment is distributed among operators of said first network and said second network; and a sixth computer readable program code for confirming said payment of the recipient to the intelligent network element.

16. A method of billing for voice short messaging services, comprising:

sending a first voice short messaging service message by a sender subscribing to a first network to a recipient subscribing to a second network;

replying to said first voice short messaging service message by said recipient using a second voice short messaging service message;

routing said second voice short messaging service message to an intelligent network element of the first network;

prompting the recipient for a payment by said intelligent network element for delivering the second voice short messaging service message to said sender, wherein the recipient is prompted for the payment through a short messaging service message prompt;

making said payment for the second voice short messaging service by said recipient through one of a premium chargeable short messaging service message and a premium chargeable reply voice call, wherein the recipient sends the premium chargeable short messaging service message to a number specified in said short messaging service message prompt;

wherein a different tariff is applied for said delivery of the second voice short messaging service message to said sender by specifying a different number in said short messaging service message prompt to which the recipient sends the premium chargeable short messaging service message;

collecting said payment by an operator of said second network and sharing a part of said payment with an operator of the first network; and confirming said payment to the intelligent network element.

\* \* \* \* \*